(12) United States Patent
Rosenberger

(10) Patent No.: US 8,682,790 B1
(45) Date of Patent: Mar. 25, 2014

(54) METHOD FOR USING DIFFERENT BILLING CYCLES FOR POINT OF SALE TRANSACTIONS

(71) Applicant: Ronald John Rosenberger, Newtown, PA (US)

(72) Inventor: Ronald John Rosenberger, Newtown, PA (US)

( * ) Notice: Subject to any disclaimer, the term of this patent is extended or adjusted under 35 U.S.C. 154(b) by 0 days.

(21) Appl. No.: 13/779,646

(22) Filed: Feb. 27, 2013

Related U.S. Application Data

(63) Continuation-in-part of application No. 13/525,750, filed on Jun. 18, 2012, which is a continuation of application No. 11/612,467, filed on Dec. 18, 2006, now Pat. No. 8,332,293, which is a continuation-in-part of application No. 11/487,680, filed on Dec. 18, 2006, now abandoned, which is a continuation-in-part of application No. 10/865,188, filed on Jun. 10, 2004, now abandoned.

(60) Provisional application No. 60/480,022, filed on Jun. 19, 2003.

(51) Int. Cl.
*G06Q 20/00* (2012.01)
*G06Q 40/00* (2012.01)

(52) U.S. Cl.
USPC .......... 705/40; 705/35; 705/39; 705/16

(58) Field of Classification Search
USPC .......................................... 705/40
See application file for complete search history.

(56) References Cited

U.S. PATENT DOCUMENTS 6,859,212 B2 * 2/2005 Kumar et al. ............... 715/744
8,204,824 B2 * 6/2012 Knowles et al. ............ 705/38

OTHER PUBLICATIONS

Bobbi Sandberg, Marty Matthews, "Quicken 2006 Quicksteps", 2005, McGraw Hill, hereinafter "Quicken".*
"Personal Budget", snapshot taken Sep. 13, 2006, available at http://web.archive.org/web/20060913000000/http://en.wikipedia.org/wiki/Personal_budget.*

* cited by examiner

*Primary Examiner* — Ryan Zeender
*Assistant Examiner* — Allen Chein

(57) ABSTRACT

The present invention provides for flexibility regarding the posting of point of sale transactions to particular billing cycles within an account. Embodiments comprise posting a point of sale transaction to a first billing cycle and then transferring the point of sale transaction to a second billing cycle, whereas a variation first selects a billing cycle and then posts the point of sale transaction to the selected billing cycle.

43 Claims, 2 Drawing Sheets

METHOD FOR USING DIFFERENT BILLING CYCLES FOR POINT OF SALE TRANSACTIONS

CROSS REFERENCE TO RELATED APPLICATIONS

This Application claims priority to and is a Continuation-In-Part Application of co-pending application Ser. No. 13/525,750, filed Jun. 18, 2012, which claims priority to application Ser. No. 11/612,467, filed Dec. 18, 2006, now issued as U.S. Pat. No. 8,332,293, each of which Applications are entirely incorporated herein by reference.

BACKGROUND OF INVENTION

Typical known credit card accounts enable end users to purchase goods and services from merchants, where a point of sale transaction from a credit card purchase posts to a billing cycle provided by the credit card company or financial institution, upon which an end user is expected to make at a least minimal payment after the close of the billing cycle, where the end user has no input or control of how the posted point of sale transactions are managed.

In making a point of sale purchase with a merchant using a standard credit card account, an end user swipes a credit card at an actual merchant point of sale, enters a credit card number to a merchant online or over the phone, etc., where the transaction request for the point of sale transaction is electronically submitted to the credit card provider. If the credit card provider electronically authorizes the transaction, the point of sale purchase is successfully completed. Subsequently, the merchant electronically submits the point of sale transaction to the credit card provider for payment; the credit card provider electronically pays the merchant for the amount of the point of sale purchase minus the amount of the transaction/interchange fees; the credit comprising the amount paid to the merchant and the amount of the transaction/interchange fees deducted from the merchant's payment is electronically offset with a debit to the end user's credit balance; and the credit card provider electronically posts the transaction to the end user's billing cycle, where the posted transactions are to be paid by the end user, where such payment occurs generally after the end user's billing cycle closes. The different electronic steps above are well known in the payments art, and require use of computer-related components, such as computerized systems, computerized networks, computer processors, computer interfaces, computer-readable mediums, computer-related or electronic apparatus, wired or wireless networks or systems, etc., all of which are well known in their associated arts. Also, the above purchasing and payment processes are typically facilitated by proprietary networks, e.g., Visa®, Mastercard®, American Express®, Discover®, and by intermediary service providers, such as merchant acquirers, payment processors, etc.

BRIEF SUMMARY OF THE INVENTION

There is a need to provide end users with more control and flexibility as to how posted transactions are managed and paid by the end user. The present invention provides end users more account control, management, and flexibility of point of sale transactions and billing cycles, where the present invention provides for one or more different billing cycles for posting point of sale transactions.

The present invention teaches transferring or selecting billing cycles for posting point of sale transactions. Such transferring or selecting of billing cycles enable end users to have more time before payment of point of sale transactions becomes due.

DETAILED DESCRIPTION OF THE INVENTION

It is crucial to understand that regardless of how many billing cycles are referenced in this disclosure, all said billing cycles are comprised within a single account.

Figure 1:
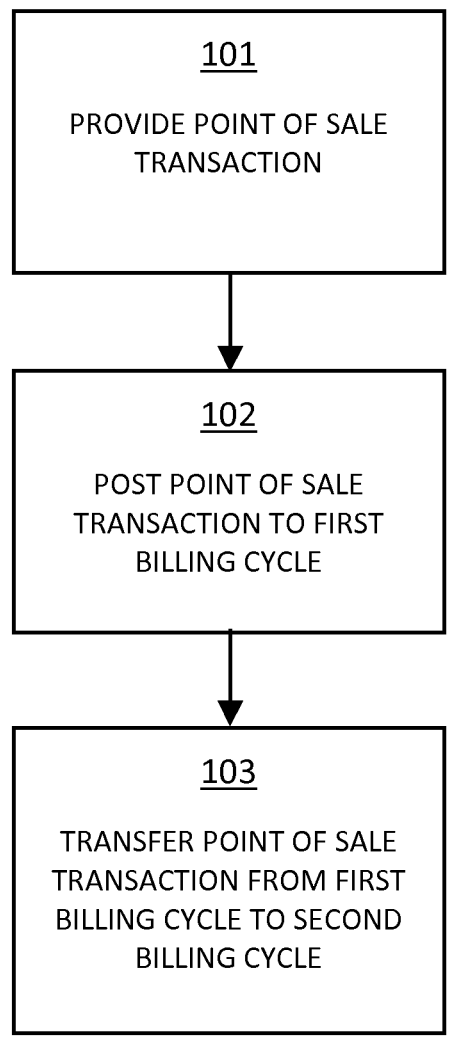
FIG. 1 is a flowchart showing an embodiment 100 of the present invention wherein a point of sale transaction is posted to a first billing cycle, and is then transferred to a second billing cycle.
Figure 2:
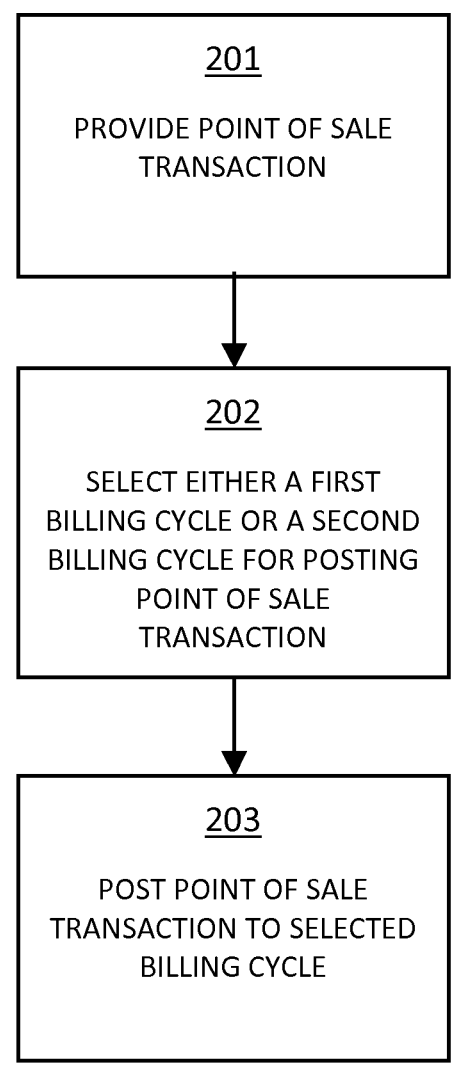
FIG. 2 is a flowchart showing an embodiment 200 of the present invention wherein either a first billing cycle or a second billing cycle is selected for a point of sale transaction, where the point of sale transaction is then posted to the selected billing cycle.

The present invention focuses on two main embodiments:
1) A first embodiment electronically posting at least one POS transaction to a first billing cycle, where the at least one POS transaction is then electronically transferred to at least one second billing cycle (see FIG. 1).
2) A second embodiment electronically selecting either a first billing cycle or a second billing cycle for posting at least one point of sale transaction, where the at least one point of sale transaction is electronically posted to the selected billing cycle (see FIG. 2).

Inherent to the above embodiments, in context of the present disclosure, is that the second billing cycle occurs after the first billing cycle, which will be illustrated in depth later.

What is also inherent is that a given end user that seeks what the present invention has to offer will want to have the flexibility to use at least one second billing cycle for posting certain POS transactions, because, as the second billing cycle occurs after the first billing cycle, transactions that are ultimately posted on the second billing cycle will become due for payment at a later time, where those transactions that are posted to the first billing cycle will become due for payment sooner.

It is vital to understand that when the desire or motivation is to ultimately post a given POS transaction to a second billing cycle, both of the above embodiments yield the exact same end result of posting the POS transaction to a second billing cycle.

An important aspect of this disclosure concerns taking a POS transaction that is posted to a first billing cycle belonging to an end user, where an electronic transfer of a POS transaction occurs where the POS transaction is transferred from a first billing cycle to at least one second billing cycle.

The example below shows plural point of sale (hereafter "POS") transaction postings to a billing cycle of a standard credit card account.

| BILLING CYCLE FOR A STANDARD CREDIT CARD ACCOUNT | | | |
|---|---|---|---|
| Date | Description | Transaction Amount | Postings to Credit Card Billing Cycle |
| Jan. 2 | Restaurant | 48.00 | 48.00 |
| Jan. 3 | Gasoline | 21.00 | 21.00 |
| Jan. 5 | Shoe Store | 36.00 | 36.00 |
| Jan. 6 | Supermarket | 63.00 | 63.00 |

-continued

BILLING CYCLE FOR A STANDARD CREDIT CARD ACCOUNT

| Date | Description | Transaction Amount | Postings to Credit Card Billing Cycle |
|---|---|---|---|
| Jan. 14 | Gasoline | 15.00 | 15.00 |
| Jan. 26 | Appliance Store | 750.00 | 750.00 |
| Jan. 28 | Gasoline | 18.00 | 18.00 |
| Jan. 30 | Restaurant | 33.00 | 33.00 |
| Jan. 31 | Close of Billing Cycle TOTAL | 984.00 | 984.00 |

The present invention can utilize the same methodology, computer-related components, proprietary networks, intermediary service providers, etc., as a standard credit card account for all of the above-described activities leading up to the posting of the POS transactions to the billing cycle. In fact, the present invention can function as an enhancement to a standard credit card account.

Conducting a POS transaction per the present invention can comprise use of a financial card, a transaction card, a personal identification system, a telephone, a cell phone, a smart phone, a computer, a computer tablet, a PDA, a radio-related device, a contactless device, or any other kind of communication device.

Furthermore, networks to access the account of the present invention can comprise any kind of network, such as a proprietary network (e.g., Visa®, Mastercard®, American Express®, Discover®), an electronic funds transfer (EFT) network, an automated clearing-house (ACH) network, the Internet, or an intranet.

While a standard credit card account comprises a single revolving credit balance for debiting POS transaction amounts, the account of the present invention can be the same as a standard credit card account in most aspects, but with the enhanced billing cycle functionality described herein. Furthermore, while a standard credit card account typically comprises a single revolving credit balance for debiting POS transaction amounts, and a standard charge card account typically comprises a single charge balance for debiting POS transaction amounts, a particular version of the account of the present invention can comprise a single credit balance for debiting POS transaction amounts, while a different account version can comprise any desired configuration of multiple credit balances, where the account comprises "at least one credit balance". Also, a single credit balance can be applicable to all of the billing cycles, some of the billing cycles, or just one of the billing cycles, where additional credit balances may or may not be desired in a particular embodiment. All of the billing cycles can share the same credit balance, two or more billing cycles can share the same credit balance, or a particular billing cycle can have its own credit balance. An account of the present invention that uses only one, or more than one, credit balance for debiting POS transaction amounts can use of any kind of credit balance, in any combination, such as a revolving credit balance, a charge balance, a line of credit, a home equity line of credit, etc.

An account comprising one or more credit balances for debiting POS transaction amounts can comprise a total credit limit, or optionally, one or more billing cycles among a plurality of billing cycles can comprise its own credit limit and/or credit balance.

The account of the present invention is envisioned as any type of credit-based financial account for the purchase of any kind of item or service from any kind of merchant or service provider that is set up to accept payment from the account, where an individual or individuals are responsible for payment of the transactions. Well-known examples of such credit-based financial accounts include credit card accounts and charge card accounts for individuals and their family members.

The present invention is optionally adaptable for business accounts. For purposes of this disclosure, business accounts are primarily used for business-related expenses, comprising a small business account, where the owner(s) of a small business is responsible for payment of the transactions (e.g., a small business credit card account or a small business charge card account); or a corporate business account, where a corporation is responsible for payment of the transactions (e.g., a corporate credit card account or a corporate charge card account). Such accounts are intended to include for-profit, as well as non-profit, entities. As business accounts used for business-related expenses are optional to the present disclosure, business accounts may be included, or fully excluded, for implementation as accounts of the present invention.

The present invention is optionally adaptable for tax-advantaged accounts. For purposes of this disclosure, tax-advantaged accounts facilitate the spending of pre-tax funds for a restricted list of permitted items, comprising a child care account, a dependent care account, or a health-related account for health-related expenditures (e.g., a flexible spending account (FSA), a health reimbursement account (HRA), a health savings account (HSA etc.). As tax-advantaged accounts are optional to the present disclosure, tax-advantaged accounts may be included, or fully excluded, for implementation as accounts of the present invention.

The present invention is optionally adaptable for tax-deferred accounts. For purposes of this disclosure, tax-deferred accounts facilitate the tax-free growth of assets contained within a tax-deferred account, and comprise an individual retirement account (IRA), a 401K account, a 529 account, a pension account, and, also for purposes of this disclosure, a Roth account such as a Roth IRA account and a Roth 401K account. As tax-deferred accounts are optional to the present disclosure, tax-deferred accounts may be included, or fully excluded, for implementation as accounts of the present invention.

The present invention is optionally adaptable for "closed-loop" accounts. For purposes of this disclosure, closed loop accounts are seen as store credit or charge cards where the credit balance can only be used for purchases at a particular merchant or a particular group of merchants. Such closed loop accounts inherently differ from credit accounts such as everyday credit card accounts that can be used for purchases from any kind of merchant or service provider that is set up to accept payment from such accounts. As closed-loop accounts are optional to the present disclosure, closed-loop accounts may be included, or fully excluded, for implementation as accounts of the present invention.

FIG. 1 shows the electronic transfer embodiment 100, where at least one point of sale transaction is electronically provided by way of a purchase with a merchant for a product or service 101, where the at least one POS transaction electronically posts to a first billing cycle 102, and the at least one POS transaction is electronically transferred from the first billing cycle to at least one second billing cycle 103. All of the steps 101-103 are electronically performed using computerized systems and methods.

It is important to note that while electronic transfers per this disclosure can occur at the desire of the end user, there is no implicit or explicit limitation in this disclosure that such electronic transfers must only occur at the desire of the end user, where such electronic transfers can also be implemented at the behest of the account provider as well, or can even be standard operating procedure for the account where the end user has no control of the electronic transfers. Some basic facts applicable throughout this disclosure are that a billing cycle is part of a credit instrument such as a credit account or credit balance that belongs to an end user.

Also, it is very important to note that these electronic transfers occur purely on the account level of the end user's account, which is maintained by an account provider comprising a financial institution, which is well known in the art. This disclosure, in the interest of brevity, uses the term "transfer", and intends the term "transfer" to mean "electronic transfer", and the term "transferring" to mean "electronically transferring". Also, other terms and their variants used throughout the disclosure such "post", and it's variants "posted", "posting" and are intended as "electronically" post, etc.; "selecting" is intended as "electronically selecting", "providing" is intended as "electronically providing", and so forth. The terms "electronic" and "electronically" are intended where it is mandatory for such operations to be performed using computerized systems and methodologies.

As these transfers occur on the account level, these transfers have nothing to do with the merchant point-of-sale where the purchase was made, where the end user would typically not involve the merchant (unless in a rare case that the merchant also coincidentally maintained the end user's financial account or the facilitating financial systems). For example, per the present method, if an end user wanted to transfer a refrigerator purchase from the current (a first) billing cycle to the next (a second) billing cycle, the end user would not 1) purchase the refrigerator on the current billing cycle; 2) return the refrigerator to the merchant for a refund; and 3) re-purchase the refrigerator during the next billing cycle. Instead, the present method performs such a transfer of a POS transaction on the account level, sans any merchant assistance whatsoever, thereby rendering such interaction or involvement with the merchant unnecessary, as well as undesirable.

In considering billing cycle transfers of POS purchase transactions, the transfer is preceded by the end user performing a POS purchase transaction with a merchant, where the POS purchase amount debits the end user's credit balance, the purchase amount is posted to the end user's (first) billing cycle, and the merchant is paid/credited with the proceeds produced by debiting the end user's credit balance (shown earlier in this disclosure).

In terms of billing cycle transfers, the present disclosure leaves the actual accounting and mechanics of doing so to the preference of the involved financial entity or entities, and can be performed using any number of methods. Such non-limiting methods can include simply moving a transaction from a first billing cycle to at least one second billing cycle, where a given credit balance for the account is not affected, minimally affected, or greatly affected by the transfer. Such can also include specific segmented accounting operations where a first billing cycle or first credit balance that was debited for a POS purchase transaction amount is credited for said amount per the desired transfer, while another second billing cycle(s) or second balance(s) is debited for said amount as a result of said transfer.

An intended purpose of enabling transfers is to give an end user more time before payment for one or more transferred POS transactions comes due. One can wonder why it would be desirable for an account provider to enable transfers (and/or the billing cycle selection feature), as such would inherently delay payment of the transferred POS transactions. One such motivation is that end users would be attracted to an account (and an account provider) that permitted such transfers, to the detriment of account providers that didn't offer such a feature, where the extra patronage and resulting revenue from such an account could more than compensate for the feature. Also, while a given account provider could basically offer this POS transaction transfer feature with no other financial consideration from an end user, a different account provider could find one or more ways to derive revenue streams from the POS transaction transfer feature. Furthermore, an account provider could decide to offer such POS transaction transfer capability as an incentive to their "better" customers that maintain their accounts in good standing, while denying lesser customers such capability, or such capabilities can be a dynamic incentive, where the capabilities are provided or withdrawn based on how well the end user maintains the account relationship, e.g., amount of patronage, number of late payments, etc. In any event, the present disclosure places no limitations as to whether or not, or how, an account provider charges, assesses, or evaluates end users for the present POS transaction transfer feature, or the billing cycle selection feature discussed more in-depth later.

The non-limiting example below shows such a POS transaction transfer by an end user for a $750 Appliance Store transaction dated 01-26 that was posted to the January (first) billing cycle, and transferred to the February (second) billing cycle.

| Date | Description | Transaction Amount | Postings to January (First) Billing Cycle | Transfers to February (Second) Billing Cycle |
|---|---|---|---|---|
| JANUARY(FIRST) BILLING CYCLE | | | | |
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |
| Jan. 6 | Supermarket | 63.00 | 63.00 | 0 |
| Jan. 14 | Gasoline | 15.00 | 15.00 | 0 |
| Jan. 26 | Appliance Store | 750.00 | 0 | 750.00 |
| Jan. 26 | USER TRANSFERS Jan. 26 APPLIANCE STORE TRANSACTION FROM JANUARY (FIRST) BILLING CYCLE TO FEBRUARY (SECOND) BILLING CYCLE | | | |
| Jan. 28 | Gasoline | 18.00 | 18.00 | 0 |
| Jan. 30 | Restaurant | 33.00 | 33.00 | 0 |
| | TOTAL | 984.00 | 234.00 | 750.00 |
| FEBRUARY (SECOND) BILLING CYCLE | | | | |

Transaction/Amount transferred from January (first) billing cycle to February (second) billing cycle: Appliance Store (original posting date of Jan. 26) $750.00

In the above example, the current January "first" billing cycle is in force. The end user wants to optimize the length of time that he has to pay for the large $750 Appliance Store purchase posted to the current January "first" billing cycle on 01-26, so he transfers the 01-26 Appliance Store purchase "at-will" to a February "second" billing cycle. An "at-will" POS transaction transfer is simply a transfer made at the whim or desire of the end user, and is generally used for a POS transaction that has already posted to a first billing cycle. Such a POS transaction transfer comprises any apparatus or assistance for making the electronic transfer. For example, an end user can access his account electronically and perform the electronic transfer using a computer, smart phone, or electronic tablet, where such account access is facilitated via the Internet; or, an end user can call up a customer service representative, where the customer service representative performs the electronic transfer on behalf of the end user.

Although the disclosure discusses "January" and "February" billing cycles for clarity sake, as it is obvious to one skilled in the art, a given billing cycle can start in one month and end in another, to where a "January" billing cycle could start in late December, thereby ending in late January (where most days of the January billing cycle are in January), where the "February" billing cycle could start in late January and end in late February (where most days of the February billing cycle are in February). Furthermore, while the examples show a particular timeframe for a billing cycle, such a timeframe is a non-limiting example, whereas this disclosure is applicable to a billing cycle comprising any number of days, weeks, etc. in duration. Also, for purposes of this disclosure, a first billing cycle can be identical or similar in length to a second billing cycle, or can be considerably different in length, where a first billing cycle can be 30 days long and the second billing cycle is 29 days long (similar length), or where a first billing cycle is 19 days long, while a second billing cycle is 31 days long (considerably different length), where this disclosure is non-limiting in this regard.

In any event, it is important to note that a "second" billing cycle per the above example does not necessarily have to be the next consecutive billing cycle. For example, while it seems logical to allow a POS transaction posted in a January (first) billing cycle to be transferred to a February (second) billing cycle, as February is the next consecutive billing cycle from January, there is nothing in this disclosure to limit which billing cycle is the "second" billing cycle for a given transaction transfer, where a "second" billing cycle in relation to a January "first" billing cycle can be a February, March, April, May, etc. billing cycle. Also, there can be more than one "second" billing cycle, aka "at least one second billing cycle", such as a February and a March billing cycle. A non-limiting example of this is where a given POS transaction posted on a January (first) billing cycle is transferred to a February (second) billing cycle, where a different POS transaction posted on the same January (first) billing cycle is transferred to a March (different second) billing cycle. Nonetheless, it is evident per the above that a given February "second" billing cycle occurs after a given January "first" billing cycle.

Furthermore, and very importantly with regards to POS transactions posted to a first billing cycle, and the transfer of the POS transactions from the first billing cycle to at least one second billing cycle: 1) the transfer can occur when the first billing cycle is an active or current billing cycle, or 2) the transfer can occur when the first billing cycle is a prior billing cycle that has already ended (closed). Citing January as a "first" billing cycle, where a POS transaction posted to the January "first" billing cycle is transferred from the January "first" billing cycle to a February "second" billing cycle, January can be an active billing cycle that has not yet ended, or January can be a prior billing cycle that ended/closed after the posting of the POS transaction to the January billing cycle.

The present disclosure is absolutely non-limiting as to the amount of time that can elapse between the posting of a POS transaction to a first billing cycle and the transfer from the first billing cycle to a second billing cycle, where such a time period could be immediately, hours, days, weeks, etc. As such, it is conceivable where a POS transaction posts to a first billing cycle, the billing cycle subsequently closes, and then the transfer of the POS transaction from the first billing cycle to a second billing cycle occurs. In such a situation where the first billing cycle has already ended/closed, this disclosure provides where one or more POS transactions can be transferred from an ended/closed first billing cycle to a current or future second billing cycle.

It was disclosed earlier that an end user (or a customer service representative on behalf of an end user) performs electronic transfers of POS transactions from a first billing cycle to at least one second billing cycle "at will". This disclosure also provides where an account provider can transfer POS transactions without any input whatsoever from an end user, for whatever reason.

Parameters are an important aspect throughout this disclosure. While it seems practical for the end user to apply parameters, and disclosure herein often references an end user applying a given parameter, the disclosure is non-limiting in that there can be accounts where an end user applies the parameters sans the account provider, accounts where an end user as well as an account provider apply parameters, or accounts where an account provider applies parameters without any input whatsoever from the end user.

Such parameters can be used to automatically perform a POS transaction transfer from a first billing cycle to at least one second billing cycle, where parameters can comprise a date parameter, an amount threshold parameter, a billing cycle balance consumption threshold parameter, and a merchant parameter. Parameters can be applied to the account one at a time, or in plural combinations. Also, parameters can be viewed where a certain condition "triggers" an action of a parameter, such as a transfer (embodiment 100), or the posting of a POS transaction to a selected billing cycle (embodiment 200).

An end user can use a date parameter to perform a POS transaction transfer. Say the end user knows on a Monday that there is going to be a large POS transaction posting to his current billing cycle by the following Wednesday or Thursday (2-3 days later). In this event, the end user can pre-date such a transfer on a Monday, so when Wednesday comes around, and the large POS transaction is posted to the first billing cycle, the transfer of the POS transaction occurs, where the transaction is posted to at least one second billing cycle. A date range can also be established to include more than one day, so if the expected transaction posts to the first billing cycle on Thursday rather than Wednesday, the desired transfer can still occur.

Such a pre-dating parameter can be very useful towards the end of a first billing cycle. With such a parameter set, say, for a seven-day range before the close of a first billing cycle, any transaction posting on a first billing cycle within a seven-day range of the close of said first billing cycle can be automatically transferred and posted to at least one second billing cycle.

While it is logical that an end user using a date parameter would want to be able to set such a date parameter, as this disclosure teaches that a date parameter can comprise any settings of any dates, date ranges, durations, timeframes, etc., an account provider could use a date parameter to create and offer a new financial product, where transfers based on date-based transfers are a "built-in" feature of the account, such as where all transactions posted to a first billing cycle within, say, a seven-day (one week) range of the close of said first billing cycle are automatically transferred to at least one second billing cycle.

Such a built-in date-based POS transaction transfer feature, as offered by an account provider, can be a static and permanent feature of the account, where the end user is not able to revise the settings whatsoever (where the date-based POS transaction transfer feature is always set, for say, a seven-day range before the close of the billing cycle), or where the end user is permitted limited capabilities in revising settings. Of course, many end users could prefer an account that enables end users to set to set pretty much any date parameters/timeframes, and to determine whether they want the date parameter feature turned on or off, which this disclosure certainly allows.

Below is an example of a billing cycle that closed on 01-31. A date parameter is set so that any transaction posted to the first billing cycle during the last seven days of the billing cycle (01-25 through 01-31) are automatically transferred to the second billing cycle.

| Date | Description | Transaction Amount | Postings to January (First) Billing Cycle | Transfers to February (Second) Billing Cycle |
|---|---|---|---|---|
| BILLING CYCLE POSTINGS ||||
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |
| Jan. 6 | Supermarket | 63.00 | 63.00 | 0 |
| Jan. 14 | Gasoline | 15.00 | 15.00 | 0 |
| TRANSACTIONS POSTED TO THE JANUARY (FIRST) BILLING CYCLE WITHIN 7 DAYS OF THE JANUARY (FIRST) BILLING CYCLE CLOSE ARE AUTOMATICALLY TRANSFERRED TO THE FEBRUARY (SECOND) BILLING CYCLE ||||
| Jan. 26 | Appliance Store | 750.00 | 0 | 750.00 |
| Jan. 28 | Gasoline | 18.00 | 0 | 18.00 |
| Jan. 30 | Restaurant | 33.00 | 0 | 33.00 |
| | TOTAL | 984.00 | 183.00 | 801.00 |
| FEBRUARY (SECOND) BILLING CYCLE ||||

Transactions/Amounts transferred from January (first) billing cycle to February (second) billing cycle:
Appliance Store (original posting date of Jan. 26) $750.00
Gasoline (original posting date of Jan. 28) $18.00
Restaurant (original posting date of Jan. 30) $33.00

In the above example, the 01-26, 01-28, and 01-30 transactions that were posted to the January (first) billing cycle were automatically transferred to the February (second) billing cycle due to the date parameter, as these three transactions posted to the January billing cycle during the last seven days (01-25 through 01-31) of the January cycle. In the above instance, the date parameter can be a temporary parameter applying to a single billing cycle, or a more default-type parameter applying to every billing cycle until the parameter setting is revised or canceled. In an account created by an account provider where the date parameter-based transferring aspect is a permanent feature of the account, every billing cycle would inherently comprise the pre-dated POS transaction transfer feature, although a different account provider can create accounts that are less rigid, and that offer the myriad flexibility taught throughout this disclosure.

In further explaining the above seven day/one week pre-date example, let's assume that a typical billing cycle is four weeks in length, where during the first three-quarters of a first billing cycle, the POS transactions that are posted to the first billing cycle remain on the first billing cycle, and during the last quarter (the last week) of the first billing cycle, the transactions that are posted to the first billing cycle are automatically transferred to a second billing cycle. The advantage for the end user here is that the last week's worth of POS transaction purchases initially posting to the first billing cycle do not become due for payment after the close of the first billing cycle, because the last week's worth of POS transaction purchases are transferred to the second billing cycle, resulting where payment for said purchases does not become due until after the close of the second billing cycle. As mentioned earlier, such a pre-date function can be a permanent account aspect, or can be a parameter that can be somewhat or fully manipulated by an end user.

A date parameter can also be used for post-dating after the fact, where if the end user specifies on a Wednesday that an item posted Monday on a first billing cycle is to be transferred from the first billing cycle to at least one second billing cycle, the date parameter can accommodate such a transfer. It should be pointed out that in place of using a date parameter to post-date transfers, an end user could simply perform such a POS transaction transfer "at will", as seen earlier.

Also, an end user can use an amount threshold parameter to perform a transfer. Here, an end user sets an amount threshold of, say, $500, so when any POS transaction at or above $500 is posted to a first billing cycle, the transaction is automatically transferred to at least one second billing cycle (where POS transactions below $500 would remain posted to the first billing cycle). Using a $500 threshold per the earlier 01-26 Appliance Store $750 POS transaction, the POS transaction would be automatically transferred from a first billing cycle to a second billing cycle. While "at or above $500" is one amount threshold condition, an amount threshold can be set for any amount, or any condition (below an amount, at an amount, above an amount, at or below an amount, at or above an amount, between two amounts, etc.).

Also, an end user can use a billing cycle balance consumption threshold parameter to perform a transfer, where an end user sets an amount of, say, $2000, once the consumption of a first billing cycle reaches or exceeds $2000 ($2000 of POS transactions posted on the first billing cycle), subsequent POS transactions that cause the consumption of the first billing cycle to exceed $2000 would be transferred from the first billing cycle to at least one second billing cycle.

Also, an end user can use a merchant parameter to perform a transfer, where an end user can select from different merchant categories such as merchants related to groceries, travel, gasoline, home improvements, etc., and can elect to have, say, "travel" and "home improvement" related transactions transferred from the first billing cycle to at least one second billing cycle.

Optionally, once a POS transaction/amount has been transferred from a first billing cycle to at least one second billing cycle, the transaction/amount can be transferred again from its at least one second billing cycle location back to either the first billing cycle (assuming the first billing cycle has not closed), or to at least one different second billing cycle.

Furthermore, while the above examples show transfers of a full amount for a POS transaction, it is optional per this disclosure that partial amounts of one or more POS transactions can be transferred as well, which results in a single POS transaction being posted to two or more billing cycles. Such a partial amount transfer, as done "at-will" by an end user, can be seen in the following example.

| Date | Description | Transaction Amount | Postings to January (First) Billing Cycle | Transfers to February (Second) Billing Cycle |
|---|---|---|---|---|
| | | JANUARY (FIRST) BILLING CYCLE | | |
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |
| Jan. 6 | Supermarket | 63.00 | 63.00 | 0 |
| Jan. 14 | Gasoline | 15.00 | 15.00 | 0 |
| Jan. 26 | Appliance Store | 750.00 | 375.00 | 375.00 |
| Jan. 26 | USER TRANSFERS Jan. 26 APPLIANCE STORE TRANSACTION PARTIAL AMOUNT OF $375 FROM JANUARY (FIRST) BILLING CYCLE TO FEBRUARY (SECOND) BILLING CYCLE | | | |
| Jan. 28 | Gasoline | 18.00 | 18.00 | 0 |
| Jan. 30 | Restaurant | 33.00 | 33.00 | 0 |
| | TOTAL | 984.00 | 609.00 | 375.00 |
| | | FEBRUARY (SECOND) BILLING CYCLE | | |

Partial amount transferred from January billing cycle to February billing cycle: Appliance Store (original posting date of Jan. 26) $375.00

In the example directly above, a partial amount of the 01-26 Appliance Store purchase of $375 is transferred to the February billing cycle, while the remaining partial amount of $375 remains on the January billing cycle.

The 01-26 Appliance Store purchase of $750 posted on the January (first) billing cycle is used below to show additional non-limiting examples of transferring partial amounts per the present invention:

1) The entire $750 amount is transferred from the January (first) billing cycle, where $375 (half) is transferred to the February (second) billing cycle, while the remaining $375 (half) is transferred to the March (different second) billing cycle.
2) A partial $500 amount is transferred from the January (first) billing cycle, where $250 (one third of the total) remains on the January billing cycle, $250 (one third of the total) is transferred to the February (second) billing cycle, and the remaining $250 (one third of the total) is transferred to the March (different second) billing cycle.

As mentioned earlier, while the January billing cycle is considered a "first" billing cycle and the February billing cycle is considered a "second" billing cycle, for purposes of this disclosure the March billing cycle is considered a different "second" billing cycle, and not a "third" billing cycle. Here, the February billing cycle and the March billing cycle comprise "at least one second billing cycle", aka one or more second billing cycles. As is obvious, the March billing cycle occurs after the February billing cycle, where the February billing cycle occurs after the January billing cycle.

While the POS transaction transfer of partial amounts, resulting in where a single POS transaction is posted to two or more billing cycles, is an operation that an end user can perform "at-will", an end user can achieve a similar result using a portion parameter to perform an automatic transfer of only a portion of a POS transaction amount, to where half of a given POS transaction would be transferred from a first billing cycle to at least one second billing cycle, while the remaining half would remain posted to the first billing cycle. Such a portion parameter can also transfer a first portion from a first billing cycle to a second billing cycle, a second portion from a first billing cycle to a different second billing cycle, all with or without leaving a remaining portion on the first billing cycle.

Also, once a POS transaction/amount has been transferred from a first billing cycle to at least one second billing cycle, the transaction/amount can optionally be transferred again from its at least one second billing cycle location back to either the first billing cycle, or to at least one different second billing cycle, where the amount that is "transferred again" can be a full or partial amount of the originally transferred POS transaction.

Partial transaction amounts and/or portion parameters can be used with one or more parameters disclosed earlier such as a date parameter, an amount threshold parameter, a billing cycle balance consumption threshold parameter, or a merchant parameter.

As the transfers of partial POS transaction amounts, resulting where portions of a single POS transaction are posted to at least two billing cycles, are optional to the present disclosure, these partial amount transfers comprising two or more billing cycles may be included, or fully excluded, for implementation in the present invention.

FIG. 2 shows the billing cycle selection embodiment 200, where at least one point of sale transaction is electronically provided by way of a purchase with a merchant for a product or service 201, either a first billing cycle or at least one second billing cycle is electronically selected for posting the POS transaction 202, and the at least one POS transaction electronically posts to the selected billing cycle 203. All of the steps 201-203 are electronically performed using computerized systems and methods.

Prior disclosure concerned taking at least one POS transaction posted to a first billing cycle, and transferring the POS transaction from the first billing cycle to at least one second billing cycle. Embodiment 200 basically yields the same end result as transferring the POS transaction from the first billing cycle to at least one second billing cycle per embodiment 100 when the end user selects the same "transferred to" second billing cycle for an embodiment 200 posting.

The non-limiting example below shows where either a first billing cycle (the current January billing cycle), or a second billing cycle (the February billing cycle), is selected for the posting of POS transactions.

BILLING CYCLE POSTINGS

| Date | Description | Transaction Amount | Postings to January (First) Billing Cycle | Postings to February (Second) Billing Cycle |
|---|---|---|---|---|
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |
| Jan. 6 | Supermarket | 63.00 | 63.00 | 0 |
| Jan. 14 | Gasoline | 15.00 | 15.00 | 0 |
| Jan. 26 | Appliance Store | 750.00 | 0 | 750.00 |
| Jan. 28 | Gasoline | 18.00 | 18.00 | 0 |
| Jan. 30 | Restaurant | 33.00 | 33.00 | 0 |
| | TOTAL | 984.00 | 234.00 | 750.00 |

The above example shows where the end user selected which billing cycle to electronically post each of the transactions. In this example, the end user elected to have most of the transactions post to the January (first) billing cycle, with the exception of the rather costly 01-26 Appliance Store transaction, which the end user posted to the February (second) billing cycle. Again, this basically yields the same end result for the 01-26 Appliance Store transaction as the earlier POS transaction transfer disclosure where all POS transactions are posted to a first billing cycle, and then selected POS transactions, such as the 01-26 Appliance Store transaction, are transferred from the first billing cycle to at least one second billing cycle.

In the above example, the end user is actively involved in the selection process of billing cycle selection for each of the transactions. Such a selection process can be facilitated in any suitable method, comprises any apparatus or assistance for making the electronic selection. For example, an end user can access his account electronically and perform the selection process to determine which billing cycle is used to electronically post a given POS transaction or a group of POS transactions using a computer, smart phone, or electronic tablet, where such account access is facilitated via the Internet; or, an end user can call up a customer service representative, where the customer service representative performs the electronic selection process on behalf of the end user. However, as such a process might be considered especially taxing on many end users, parameters can be used in addition to, or in place of, making billing cycle posting decisions for each individual POS transaction or group of POS transactions.

In the above situation, an option is where the end user, or account provider, can select a default billing cycle for POS transactions, such as a first billing cycle, or at least one second billing cycle, where the default billing cycle can be changed "at-will", where any subsequent desired revisions can be performed using electronic transfers per the earlier section of this disclosure, either "at-will", or by using parameters.

Additionally, parameters can be used to perform billing cycle posting selection, comprising a date parameter, an amount threshold parameter, a billing cycle balance consumption threshold parameter, and a merchant parameter. Such parameters can be applied to the account one at a time, or in plural combinations.

An end user can use a date parameter to perform billing cycle posting selection, where certain POS transactions are posted to a first billing cycle or at least one second billing cycle depending on the date or date range established by an end user. Say the end user knows on a Monday that there is going to be a large POS transaction posting to his account by the following Wednesday or Thursday (2-3 days later). In this event, the end user can pre-date such a posting on a Monday, so when Wednesday comes around, and the large POS transaction is presented to the account, the transaction is automatically posted to at least one second billing cycle instead of the current first billing cycle. A date range can also be established to include more than one day, so if the expected transaction appears on Thursday rather than Wednesday, the transaction can post to the desired billing cycle.

Such a pre-dating parameter can be very useful towards the end of a first billing cycle. With such a parameter set, say, for a seven-day range before the close of a first billing cycle, any transaction occurring within a seven-day range of the close of said first billing cycle is automatically posted to at least one second billing cycle, without ever posting to the first billing cycle.

While it is logical that an end user using a date parameter would want to be able to set such a date parameter, as this disclosure teaches that a date parameter can comprise any settings of any dates, date ranges, durations, timeframes, etc., an account provider could use a date parameter to create and offer a new financial product, where date-based billing cycle postings are a "built-in" feature of the account, such as where all transactions presented to an account within, say, a seven-day range of the close of said first billing cycle are automatically posted to at least one second billing cycle, without ever posting to the first billing cycle.

Such a built-in date-based billing cycle posting feature, as offered by an account provider, can be a static and permanent feature of the account, where the end user is not able to revise the settings whatsoever (where the date-based POS transaction transfer feature is always set, for say, a seven-day range before the close of the billing cycle), or where the end user is permitted limited capabilities in revising settings. Of course, many end users could prefer an account that enables end users to set pretty much any date parameters/timeframes, and to determine whether they want the date parameter feature turned on or off, which this disclosure certainly allows.

Below is an example of a billing cycle that closes on 01-31. A date parameter is set so that any transaction presented to the account during the last seven days of the first billing cycle (01-25 through 01-31) are automatically posted to the second billing cycle, without ever being posted to the first billing cycle, whereas all transactions presented to the account prior to the last seven days of the billing first cycle are automatically posted to the first billing cycle.

| Date | Description | Transaction Amount | Postings to January (First) Billing Cycle | Postings to February (Second) Billing Cycle |
|---|---|---|---|---|
| | | BILLING CYCLE POSTINGS | | |
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |

-continued

| Date | Description | Transaction Amount | Postings to January (First) Billing Cycle | Postings to February (Second) Billing Cycle |
|---|---|---|---|---|
| Jan. 6 | Supermarket | 63.00 | 63.00 | 0 |
| Jan. 14 | Gasoline | 15.00 | 15.00 | 0 |
| TRANSACTIONS PRESENTED WITHIN 7 DAYS OF THE JANUARY (FIRST) BILLING CYCLE CLOSE ARE AUTOMATICALLY POSTED TO THE FEBRUARY (SECOND) BILLING CYCLE | | | | |
| Jan. 26 | Appliance Store | 750.00 | 0 | 750.00 |
| Jan. 28 | Gasoline | 18.00 | 0 | 18.00 |
| Jan. 30 | Restaurant | 33.00 | 0 | 33.00 |
| | TOTAL | 984.00 | 183.00 | 801.00 |
| FEBRUARY (SECOND) BILLING CYCLE | | | | |

Transactions/Amounts presented within seven days of January (first) billing cycle close that are posted to February (second) billing cycle:
Appliance Store (original account presentation date of Jan. 26) $750.00
Gasoline (original account presentation date of Jan. 28) $18.00
Restaurant (original account presentation date of Jan. 30) $33.00

In the above example, the 01-26, 01-28, and 01-30 transactions that were presented to the account during the last seven day timeframe of the January (first) billing cycle were automatically posted to the February (second) billing cycle due to the date parameter, as these three transactions were presented during the last seven days (01-25 through 01-31) of the January billing cycle. In the above instance, the date parameter can be a temporary parameter applying to a single billing cycle, or a more default-type parameter applying to every billing cycle until the parameter setting is revised or canceled. In an account created by an account provider where the date parameter-based posting aspect is a permanent feature of the account, every billing cycle would inherently comprise the pre-dated posting feature, although, again, a different account provider can create accounts that offer the myriad flexibility taught throughout this disclosure.

In further explaining the above seven day/one week pre-date parameter example, let's assume that a typical billing cycle is four weeks in length, where during the first three-quarters of a first billing cycle, the POS transactions are posted to the first billing cycle, and during the last quarter (the last week) of the first billing cycle, the transactions that would normally post to the first billing cycle are instead automatically posted to a second billing cycle. The advantage for the end user here is that the last week's worth of POS transaction purchases alternatively posting to the second billing cycle (instead of the first billing cycle) do not become due for payment until after the close of the second billing cycle. As mentioned earlier, such a pre-date function can be a permanent account aspect, or can be a parameter that can be somewhat or fully manipulated by an end user.

As seen earlier, a date parameter can also be used for post-dating after the fact, where such post dating here acts as a POS transaction transfer discussed earlier, rather than an instruction for the initial posting of a POS transaction to a billing cycle, where if the end user specifies on a Wednesday that an item posted Monday on a first billing cycle is to be transferred from the first billing cycle to at least one second billing cycle, the date parameter can accommodate such a transfer. It should be pointed out that in place of using a date parameter to post-date transfers, an end user could simply perform such a POS transaction transfer "at will".

Also, an end user can use an amount threshold parameter to determine whether to post a given POS transaction to a first billing cycle, or to at least one second billing cycle. An end user could set an amount threshold of, say, $500, so when any POS transaction at or above $500 is presented to the account, the transaction is automatically posted to at least one second billing cycle (where POS transactions below $500 would automatically post to a first billing cycle). Using this $500 amount threshold setting per the earlier 01-26 Appliance Store $750 POS transaction, the POS transaction would automatically post to a second billing cycle, and not a first billing cycle. As mentioned earlier, while "at or above $500" is one amount threshold condition, an amount threshold can be set for any amount, or any condition (below an amount, at an amount, above an amount, at or below an amount, at or above an amount, between two amounts, etc.).

Also, an end user can use a billing cycle balance consumption threshold parameter to determine which billing cycle to post a given POS transaction to, where an end user sets an amount of, say, $2000, once the consumption of a first billing cycle reaches or exceeds $2000 ($2000 of POS transactions posted on the first billing cycle), subsequent POS transactions that cause the consumption of the first billing cycle to exceed $2000 would automatically post to at least one second billing cycle.

Furthermore, an end user can use a merchant parameter to determine which billing cycle to post a given POS transaction to, where an end user can select from different merchant categories such as merchants related to groceries, travel, gasoline, home improvements, etc., and can elect to have, say "travel" and "home improvement" related transactions automatically post to at least one second billing cycle, whereas other POS transactions would by default automatically post to a first billing cycle.

Optionally, once a POS transaction/amount has been posted to a selected billing cycle, the transaction/amount can then be transferred from the selected billing cycle to a different billing cycle, wherein 1) the selected billing cycle can be a current billing cycle; 2) the selected billing cycle can be a prior billing cycle that has ended (closed) after the posting of the POS transaction/amount; or, 3) the selected billing cycle can be a future billing cycle that has not yet started. Citing January as an example of a "selected billing cycle" to which a POS transaction has been posted, and from which a transfer of the POS transaction will occur, January can be a current billing cycle that has started but not yet ended; January can be a prior billing cycle that has already ended/closed, where the January billing cycle close occurred after the posting of the January POS transaction; or, January can be a future billing cycle that has not yet started. As mentioned earlier, the present disclosure is absolutely non-limiting as to the amount of time that can elapse between the posting of a POS transaction to a selected billing cycle and the transfer from the selected billing cycle to a different billing cycle, where such a time period could be immediately, hours, days, weeks, etc. As such, it is perfectly conceivable where a POS transaction posts to the selected billing cycle, the selected billing cycle subsequently closes, and then the transfer of the POS transaction from the selected billing cycle to a different billing cycle occurs.

Also, while the above examples shows selective postings of full amounts for a transaction, it is optional that partial amounts can be posted to two or more billing cycles as well. Such a partial amount posting, as done "at-will" by an end user, can be seen in the following example.

While the selected posting of partial amounts, resulting in where a single POS transaction is posted to two or more billing cycles, is an operation that an end user can perform "at-will", an end user can achieve a similar result using a portion parameter to perform automatic posting of a POS transaction amount to two or more billing cycles, to where, say, half of a given POS transaction would be posted to a first billing cycle, while the remaining half would be posted to a second billing cycle.

Once posted, such portions can optionally be transferred among the varied billing cycles of an account.

Partial transaction amounts and/or portion parameters can be used with one or more parameters disclosed earlier such as a date parameter, an amount threshold parameter, a billing cycle balance consumption threshold parameter, or a merchant parameter.

| Date | Description | Transaction Amount | Postings to January (First) Billing Cycle | Postings to February (Second) Billing Cycle |
|---|---|---|---|---|
| JANUARY (FIRST) BILLING CYCLE ||||| 
| Jan. 2 | Restaurant | 48.00 | 48.00 | 0 |
| Jan. 3 | Gasoline | 21.00 | 21.00 | 0 |
| Jan. 5 | Shoe Store | 36.00 | 36.00 | 0 |
| Jan. 6 | Supermarket | 63.00 | 63.00 | 0 |
| Jan. 14 | Gasoline | 15.00 | 15.00 | 0 |
| Jan. 26 | Appliance Store | 750.00 | 375.00 | 375.00 |
| Jan. 26 | HALF OF Jan. 26 APPLIANCE STORE TRANSACTION AMOUNT OF $375 IS POSTED TO JANUARY (FIRST) BILLING CYCLE, AND REMAINING HALF IS POSTED TO FEBRUARY (SECOND) BILLING CYCLE ||||
| Jan. 28 | Gasoline | 18.00 | 18.00 | 0 |
| Jan. 30 | Restaurant | 33.00 | 33.00 | 0 |
| | TOTAL | 984.00 | 609.00 | 375.00 |
| FEBRUARY (SECOND) BILLING CYCLE |||||

Partial amount posted to February billing cycle: Appliance Store (original posting date of Jan. 26) $375.00

In the example directly above, a partial amount of the 01-26 Appliance Store purchase of $375 is posted to the January (first) billing cycle, while the remaining partial amount of $375 is posted on the February (second) billing cycle.

The Appliance Store purchase amount of $750 is used below to show additional examples of posting partial amounts per the present invention:

1) Half of the Appliance Store purchase ($375) is posted to the February (second) billing cycle, while the remaining $375 is posted to the March (different second) billing cycle.
2) One third of the Appliance Store purchase ($250) is posted to the January (first) billing cycle, another third is posted to the February (second) billing cycle, and the remaining third is posted to the March (different second) billing cycle.

It bears repeating that the January billing cycle is considered a "first" billing cycle and the February billing cycle is considered a "second" billing cycle, for purposes of this disclosure the March billing cycle is considered a different "second" billing cycle, and not a "third" billing cycle. Here, the February billing cycle and the March billing cycle comprise "at least one second billing cycle", aka one or more second billing cycles. As is obvious, the March billing cycle occurs after the February billing cycle, where the February billing cycle occurs after the January billing cycle.

As the posting of partial transaction amounts of a single POS transaction to two or more billing cycles are optional to the present disclosure, such partial postings to two or more billing cycles may be included, or fully excluded, for implementation in the present invention.

POTENTIAL ASPECTS OR ELEMENTS OF THE CLAIMED INVENTION THAT CAN BE OPTIONALLY EXCLUDED OR NEGATIVELY CLAIMED

The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one or more, or any combination of any component or step disclosed herein, e.g., but not limited to any one or more or any combination of: a method; a computerized system; a computer-related component; a computerized network; a computer processor; a computer interface; a computer-readable medium; a computer-related or electronic apparatus; or wired or wireless network or system to provide a first billing cycle; at least one second billing cycle; an electronic billing cycle transfer; an electronic transfer determined by an end user; an electronic transfer determined by an account provider; an electronic transfer of a full amount of a POS transaction; an electronic transfer where the first billing cycle is current or active; an electronic transfer where the first billing cycle has closed or ended; an electronic transfer determined by a parameter; an electronic transfer performed at-will; an electronic transfer performed according to a date parameter; an electronic transfer performed according to a date, range, duration, or timeframe; an electronic transfer triggered by an amount threshold parameter, a billing cycle balance consumption parameter, or a merchant parameter; an electronic transfer from a second billing cycle to a different billing cycle; an electronic transfer of a partial amount of a POS transaction; an electronic transfer resulting in posting portions of a single POS transaction to two or more billing cycles; an electronic transfer using a portion parameter; an electronic billing cycle selection; an electronic billing cycle posting determined by an end user; an electronic billing cycle posting determined by an account provider; an electronic billing cycle posting determined by a parameter; an electronic billing cycle posting performed at-will; an electronic billing cycle posting performed according to a date parameter; an electronic billing cycle posting performed according to a date, date range, duration, or timeframe; an electronic billing cycle posting triggered by an amount threshold parameter, a billing cycle balance consumption parameter, or a merchant parameter; an electronic transfer of a POS transaction from a current or active billing cycle; an electronic transfer of a POS transaction from a billing cycle that is closed or ended; electronic posting of portions of a single POS transaction to two or more billing cycles; an electronic posting using a portion parameter; an electronic selection of a default billing cycle for posting POS transactions; a proprietary network; an electronic funds transfer network; an automated clearing-house network; the Internet; an intranet, an intermediary service provider; a financial card; a transaction card; a personal identification system; a telephone; a cell phone; a smart phone; a computer; a computer tablet; a PDA; a radio-related device; a contactless device; a communication device; a revolving credit balance; a charge balance; a line of credit; a home equity line of credit; a credit account; a credit account for individuals; a credit account for individuals and their family members; a credit card account for individuals; a credit card account for individuals and their family members; a charge card account; a charge card account for individuals; a charge card account for individuals and their family members; a line of credit account; a business account; a small business account; a corporate business account; for-profit entities; non-profit entities; a tax-advantaged account; spending of pre-tax funds; a child care account; a dependent care account; a health-related account; a health-related account for health-related expenditures; a flexible spending account (FSA); a health reimbursement account (HRA); a health savings account (HSA); a tax-deferred account; an individual retirement account (IRA); a 401K account; a 529 account; a pension account; a Roth IRA account; a Roth 401K account; a closed loop account; a store credit card; or a store charge card.

The invention claimed is:

1. A method for electronically transferring at least one point of sale (POS) transaction from a first billing cycle to at least one second billing cycle in an account, said method comprising:
   a. electronically providing by a computer said account, wherein said account is used by an end user to purchase goods and services from merchants, thereby providing said at least one POS transaction, and wherein said account comprises said at least one credit balance, said first billing cycle, said at least one second billing cycle, and said at least one POS transaction;
   b. electronically posting by a computer said at least one POS transaction to said first billing cycle; and,
   c. properly electronically transferring by a computer said at least one POS transaction from said first billing cycle to said at least one second billing cycle, wherein said at least one POS transaction is electronically posted to said at least one second billing cycle;
   wherein said POS transaction would ordinarily and properly electronically post to said first billing cycle; wherein said at least one second billing cycle occurs after said first billing cycle; and wherein electronically transferring said at least one POS transaction from said first billing cycle to said at least one second billing cycle changes when payment of said at least one POS transaction is due to the provider of said account to a later date.

2. A method according to claim 1, wherein the step of electronically transferring said at least one POS transaction from said first billing cycle to said at least one second billing cycle is determined by an end user.

3. A method according to claim 1, wherein the step of electronically transferring said at least one POS transaction from said first billing cycle to said at least one second billing cycle occurs at-will.

4. A method according to claim 1, wherein the step of electronically transferring said at least one POS transaction from said first billing cycle to said at least one second billing cycle is determined using at least one date parameter.

5. A method according to claim 1, wherein the step of electronically transferring said at least one POS transaction from said first billing cycle to said at least one second billing cycle is triggered using at least one parameter selected from the group consisting of: at least one amount threshold parameter and at least one billing cycle balance consumption parameter.

6. A method according to claim 1, wherein the step of electronically transferring said at least one POS transaction from said first billing cycle to said at least one second billing cycle comprises posting entire amounts of said at least one POS transaction.

7. A method according to claim 1, wherein the step of electronically transferring said at least one POS transaction from said first billing cycle to said at least one second billing cycle occurs when said first billing cycle is an active billing cycle.

8. A method according to claim 1, wherein said at least one credit balance comprises at least one revolving credit balance.

9. A method according to claim 1, further comprising wherein said at least one POS transaction electronically transferred from said first billing cycle to said at least one second billing cycle is again electronically transferred back to said first billing cycle, or is electronically transferred to at least one different second billing cycle.

10. A method according to claim 1, further comprising wherein an entire single POS transaction, or portions of said single POS transaction, is transferred from said first billing cycle at-will, resulting wherein said single POS transaction is posted to at least two billing cycles.

11. A method according to claim 1, further comprising wherein any billing cycle comprises at least one selected from the group consisting of: 1) its own credit limit, and 2) its own credit balance.

12. A method according to claim 1, wherein the step of electronically transferring said at least one POS transaction from said first billing cycle to said at least one second billing cycle is determined by a provider of said account.

13. A method according to claim 1, wherein the step of electronically transferring said at least one POS transaction from said first billing cycle to said at least one second billing cycle occurs when said first billing cycle is a closed billing cycle.

14. A method according to claim 1, wherein said account is for at least one individual, wherein said at least one individual is not a business entity.

15. A method according to claim 1, further comprising wherein said account is a business account for a business entity intended for paying business-related expenses.

16. A method according to claim 1, further comprising wherein said account is a closed-loop account.

17. A method according to claim 1, further comprising wherein said account is a tax-advantaged account.

18. A method according to claim 1, further comprising wherein said account is a tax-deferred account.

19. A method according to claim 1, wherein the step of electronically transferring said at least one POS transaction from said first billing cycle to said at least one second billing cycle is triggered using at least one merchant parameter.

20. A method according to claim 1, further comprising wherein an entire single POS transaction, or portions of said single POS transaction, is transferred from said first billing cycle through use of a portion parameter, resulting wherein said single POS transaction is posted to at least two billing cycles.

21. A method according to claim 1, wherein said at least one credit balance comprises at least one selected from the group consisting of: at least one charge credit balance, at least one line of credit, and at least one home equity line of credit.

22. A method according to claim 1, wherein the step of electronically transferring said at least one POS transaction from said first billing cycle to said at least one second billing cycle is determined by a provider of said account thorough use of at least one parameter.

23. A method for electronically selecting at least one second billing cycle in an account for posting at least one point of sale (POS) transaction, said method comprising:
  a. electronically providing by a computer said account, wherein said account is used by an end user to purchase goods and services from merchants, thereby providing said at least one POS transaction, and wherein said account comprises said at least one credit balance, a first billing cycle, said at least one second billing cycle, and said at least one POS transaction;
  b. properly electronically selecting by a computer said at least one second billing cycle for posting said at least one POS transaction; and
  c. electronically posting by a computer said at least one POS transaction to said at least one second billing cycle;
  wherein said POS transaction would ordinarily and properly electronically post to said first billing cycle; wherein said at least one second billing cycle occurs after said first billing cycle; and wherein electronically selecting said at least one second billing cycle for posting said at least one POS transaction changes when payment of said at least one POS transaction is due to the account provider to a later date.

24. A method according to claim 23, wherein the step of electronically selecting said at least one second billing cycle for posting said at least one POS transaction is determined by an end user.

25. A method according to claim 23, wherein the step of electronically selecting said at least one second billing cycle for posting said at least one POS transaction occurs at-will.

26. A method according to claim 23, wherein the step of electronically selecting said at least one second billing cycle for posting said at least one POS transaction is determined using at least one date parameter.

27. A method according to claim 23, wherein the step of electronically selecting said at least one second billing cycle for posting said at least one POS transaction is triggered using at least one parameter selected from the group consisting of: at least one amount threshold parameter and at least one billing cycle balance consumption parameter.

28. A method according to claim 23, wherein the step of electronically selecting said at least one second billing cycle for posting said at least one POS transaction comprises posting entire amounts of said at least one POS transaction.

29. A method according to claim 23, wherein said at least one credit balance comprises at least one revolving credit balance.

30. A method according to claim 23, further comprising wherein either said first billing cycle or said at least one second billing cycle is a default billing cycle for posting said at least one POS transaction when an electronic selection has not been made for said at least one POS transaction, wherein said default billing cycle is selected by at least one selected from the group consisting of: an end user and a provider of said account.

31. A method according to claim 23, further comprising wherein said at least one POS transaction electronically posted to said at least one second billing cycle is electronically transferred from said at least one second billing cycle to at least one different billing cycle, wherein said at least one second billing cycle is an active billing cycle or a closed billing cycle.

32. A method according to claim 23, further comprising wherein portions of a single POS transaction are electronically posted to at least two billing cycles as selected at-will.

33. A method according to claim 23, further comprising wherein any billing cycle comprises at least one selected from the group consisting of: 1) its own credit limit, and 2) its own credit balance.

34. A method according to claim 23, wherein the step of electronically selecting said at least one second billing cycle for posting said at least one POS transaction is determined by a provider of said account.

35. A method according to claim 23, wherein said account is for at least one individual, wherein said at least one individual is not a business entity.

36. A method according to claim 23, further comprising wherein said account is a business account for a business entity intended for paying business-related expenses.

37. A method according to claim 23, further comprising wherein said account is a closed-loop account.

38. A method according to claim 23, further comprising wherein said account is a tax-advantaged account.

39. A method according to claim 23, further comprising wherein said account is a tax-deferred account.

40. A method according to claim 23, wherein the step of electronically selecting said at least one second billing cycle for posting said at least one POS transaction is triggered using at least one merchant parameter.

41. A method according to claim 23, further comprising wherein portions of a single POS transaction are electronically posted to at least two billing cycles through use of a portion parameter.

42. A method according to claim 23, wherein said at least one credit balance comprises at least one selected from the group consisting of: at least one charge credit balance, at least one line of credit, and at least one home equity line of credit.

43. A method according to claim 23, wherein the step of electronically selecting said at least one second billing cycle for posting said at least one POS transaction is determined by a provider of said account through use of at least one parameter.

* * * * *

UNITED STATES PATENT AND TRADEMARK OFFICE
CERTIFICATE OF CORRECTION

PATENT NO. : 8,682,790 B1  
APPLICATION NO. : 13/779646  
DATED : March 25, 2014  
INVENTOR(S) : Ronald John Rosenberger Page 1 of 1

It is certified that error appears in the above-identified patent and that said Letters Patent is hereby corrected as shown below:

In the Claims:

Column 19, line 67, "comprises said at least one credit balance" should read -comprises at least one credit balance-.

Column 21, line 48, "comprises said at least one credit balance" should read -comprises at least one credit balance-.

Signed and Sealed this
Seventeenth Day of June, 2014

Michelle K. Lee
*Deputy Director of the United States Patent and Trademark Office*